(12) United States Patent
Suk et al.

(10) Patent No.: US 10,776,929 B2
(45) Date of Patent: Sep. 15, 2020

(54) METHOD, SYSTEM AND NON-TRANSITORY COMPUTER-READABLE RECORDING MEDIUM FOR DETERMINING REGION OF INTEREST FOR PHOTOGRAPHING BALL IMAGES

(71) Applicant: CREATZ Inc., Gyeonggi-do (KR)

(72) Inventors: Yong Ho Suk, Gyeonggi-do (KR); Jey Ho Suk, Seoul (KR)

(73) Assignee: CREATZ INC., Suwon-si, Gyeonggi-Do (KR)

( * ) Notice: Subject to any disclaimer, the term of this patent is extended or adjusted under 35 U.S.C. 154(b) by 26 days.

(21) Appl. No.: 15/637,416

(22) Filed: Jun. 29, 2017

(65) Prior Publication Data
US 2018/0005383 A1    Jan. 4, 2018

(30) Foreign Application Priority Data

Jun. 29, 2016 (KR) .................. 10-2016-0081881

(51) Int. Cl.
*A63B 24/00* (2006.01)
*A63B 69/36* (2006.01)
(Continued)

(52) U.S. Cl.
CPC .............. *G06T 7/215* (2017.01); *G01C 11/02* (2013.01); *G06T 7/248* (2017.01); *G06T 7/35* (2017.01); *H04N 5/2256* (2013.01); *H04N 5/232* (2013.01); *A63B 69/3658* (2013.01); *G01S 3/7864* (2013.01); *G06T 2207/30168* (2013.01); *G06T 2207/30224* (2013.01)

(58) Field of Classification Search
CPC ......... G01C 11/02; G06T 7/215; G06T 7/248; G06T 7/35; G06T 2207/30168; G06T 2207/30224; H04N 5/2256; H04N 5/232; A63B 2024/0021; A63B 69/3658; G01S 3/7864

See application file for complete search history.

(56) References Cited

U.S. PATENT DOCUMENTS 5,208,872 A * 5/1993 Fisher .................. G06T 3/0093
                                                    382/114
5,392,088 A * 2/1995 Abe ...................... G01S 3/7864
                                                    348/169
(Continued)

FOREIGN PATENT DOCUMENTS

KR    10-2009-0112538 A    10/2009

*Primary Examiner* — Yubin Hung
(74) *Attorney, Agent, or Firm* — Dinsmore & Shohl LLP; Yongsok Choi, Esq.

(57) ABSTRACT

The present invention relates to a method, system and non-transitory computer-readable recording medium for determining a region of interest for photographing ball images. According to one aspect of the invention, there is provided a method for determining a region of interest for photographing ball images, comprising the steps of: recognizing a location of a ball whose physical quantity is to be measured, in a state in which shot preparation is completed; and dynamically determining a region of interest to be photographed to acquire images including an appearance of the ball, with reference to the location of the ball and at least one of a predicted moving direction of the ball and a location of at least one camera configured to photograph the ball.

11 Claims, 3 Drawing Sheets

(51) Int. Cl.
*G01S 3/786* (2006.01)
*G06T 7/215* (2017.01)
*H04N 5/232* (2006.01)
*H04N 5/225* (2006.01)
*G06T 7/246* (2017.01)
*G06T 7/35* (2017.01)
*G01C 11/02* (2006.01)

(56) References Cited

U.S. PATENT DOCUMENTS

| | | | | |
|---|---|---|---|---|
| 8,929,603 | B1* | 1/2015 | Maali | G06K 9/00771 |
| | | | | 348/143 |
| 9,305,217 | B2* | 4/2016 | Lee | G06K 9/00664 |
| 9,457,246 | B2* | 10/2016 | Leech | G06F 3/0304 |
| 2003/0035051 | A1* | 2/2003 | Cho | G01S 3/7865 |
| | | | | 348/169 |
| 2004/0032970 | A1* | 2/2004 | Kiraly | A63B 24/0021 |
| | | | | 382/103 |
| 2009/0129644 | A1* | 5/2009 | Daw | G16H 40/20 |
| | | | | 382/128 |
| 2011/0090345 | A1* | 4/2011 | Ishii | H04N 5/23248 |
| | | | | 348/169 |
| 2011/0299729 | A1* | 12/2011 | Dawe | A63B 24/0003 |
| | | | | 382/103 |
| 2012/0020098 | A1* | 1/2012 | Lee | F21V 19/02 |
| | | | | 362/419 |
| 2012/0033855 | A1* | 2/2012 | Ryan | G06T 7/20 |
| | | | | 382/103 |
| 2014/0004969 | A1* | 1/2014 | Jang | G09B 19/0038 |
| | | | | 473/156 |
| 2014/0160294 | A1* | 6/2014 | Naylor | G08B 13/19606 |
| | | | | 348/155 |
| 2015/0350606 | A1* | 12/2015 | Khanfor | H04N 5/247 |
| | | | | 348/157 |
| 2018/0017659 | A1* | 1/2018 | Irie | H04N 5/23296 |

* cited by examiner

METHOD, SYSTEM AND NON-TRANSITORY COMPUTER-READABLE RECORDING MEDIUM FOR DETERMINING REGION OF INTEREST FOR PHOTOGRAPHING BALL IMAGES

CROSS-REFERENCE TO RELATED APPLICATIONS

This application claims priority to Korean Patent Application No. 10-2016-0081881 filed on Jun. 29, 2016, the entire contents of which are hereby incorporated by reference.

FIELD OF THE INVENTION

The present invention relates to a method, system and non-transitory computer-readable recording medium for determining a region of interest for photographing ball images.

BACKGROUND

Virtual golf systems are widely spreading which allow golfers to virtually play golf at low cost in downtown areas and the like. The basic concept of such virtual golf systems is to acquire a number of photographed images of a golf ball upon being hit by a golfer, measure physical quantities of the golf ball on the basis of the trajectory, interval, size and the like thereof, perform a simulation of the shot, and display a result of the simulation on a screen. In the virtual golf systems, it is important to acquire the photographed images of the golf ball as good as possible.

In this connection, a technique for photographing a golf training session while adjusting the location or color of illumination to acquire more diverse images of a golf ball has been disclosed in Korean Laid-open Patent Publication No. 10-2009-0112538 (entitled, "APPARATUS FOR OBTAINING GOLF IMAGES USING ILLUMINATION CONTROL, AND GOLF PRACTICE SYSTEM BASED ON IMAGE PROCESSING USING IT"), the contents of which are incorporated herein by reference in its entirety. However, various conventional techniques including the above one have not been concerned with a technique required to efficiently acquire golf ball images, which are necessary in accurately measuring a physical quantity of a golf ball, or a technique for measuring physical quantities of a golf ball using a mark sequence obtainable from a plurality of golf ball images.

Therefore, the inventor(s) present a novel technique for accurately measuring physical quantities of a golf ball, by efficiently acquiring golf ball images from a high-speed camera capable of photographing many frames of images for a short time and analyzing a mark sequence appearing in the acquired golf ball images.

SUMMARY OF THE INVENTION

One object of the present invention is to dynamically determine a region of interest to be photographed to acquire images including an appearance of a ball, so that a plurality of golf ball images, which are necessary in accurately measuring a physical quantity of the ball, may be efficiently acquired.

Another object of the invention is to analyze a mark sequence appearing in a plurality of golf ball images to measure a spin rate and a spin direction of a golf ball.

The representative configurations of the invention to achieve the above objects are described below.

According to one aspect of the invention, there is provided a method for determining a region of interest for photographing ball images, comprising the steps of: recognizing a location of a ball whose physical quantity is to be measured, in a state in which shot preparation is completed; and dynamically determining a region of interest to be photographed to acquire images including an appearance of the ball, with reference to the location of the ball and at least one of a predicted moving direction of the ball and a location of at least one camera configured to photograph the ball.

According to another aspect of the invention, there is provided a system for determining a region of interest for photographing ball images, comprising: at least one camera configured to photograph a ball whose physical quantity is to be measured; and a control unit configured to recognize a location of the ball in a state in which shot preparation is completed, and dynamically determine a region of interest to be photographed to acquire images including an appearance of the ball, with reference to the location of the ball and at least one of a predicted moving direction of the ball and a location of the at least one camera.

In addition, there are further provided other methods, systems and non-transitory computer-readable recording media to implement the present invention.

According to the invention, it is possible to dynamically determine a region of interest to be photographed to acquire images including an appearance of a golf ball, so that a plurality of golf ball images, which are necessary in accurately measuring a physical quantity of the ball, may be efficiently acquired, and thus resources and time spent in processing and analyzing the golf ball images may be saved.

According to the invention, a spin rate and a spin direction of a golf ball may be accurately measured using a time-sequential set of marks (i.e., a mark sequence) appearing over a plurality of golf ball images.

DETAILED DESCRIPTION

Figure 1:
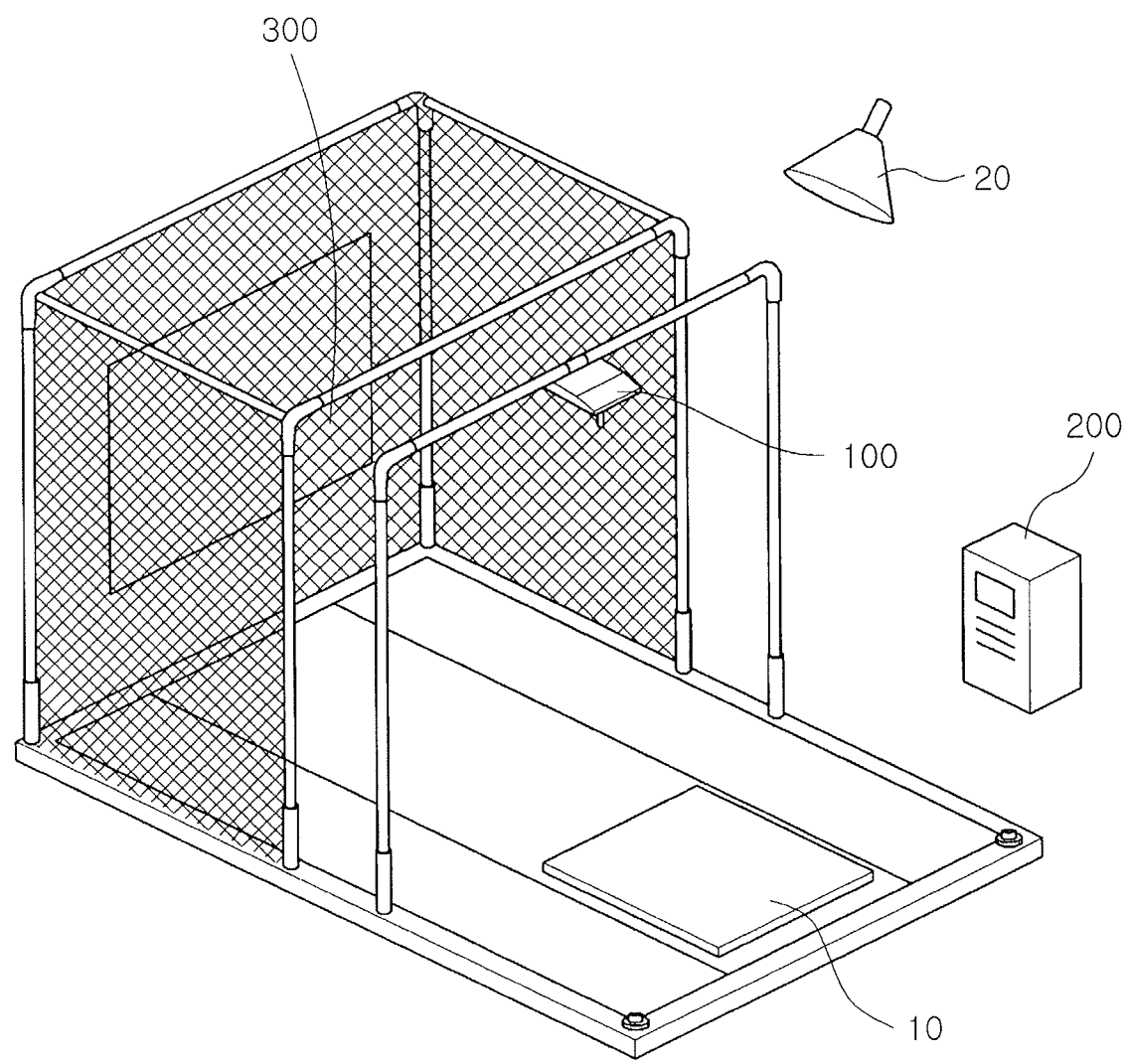
FIG. 1 is a schematic diagram of the overall configuration of a virtual golf system according to one embodiment of the invention.

In the following detailed description of the invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, or characteristics described herein may be implemented as modified from one embodiment to another embodiment without departing from the spirit and the scope of the invention. Furthermore, it shall be understood that the locations or arrangements of individual elements within each embodiment may be also modified without departing from the spirit and the scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of Overall System

FIG. 1 is a schematic diagram of the overall configuration of a virtual golf system according to one embodiment of the invention.

As shown in FIG. 1, the virtual golf system may be configured to comprise a shot unit 10, an illumination device 20, a photographing device 100, a simulator 200, and a display device 300.

First, the shot unit 10 according to one embodiment of the invention may be a part on which a golfer steps up to place and hit a golf ball when using the virtual golf system. The shot unit 10 may comprise a known swing plate, the tilt angle of which may be adjusted. It will be note that when the invention is applied to other kinds of virtual sport systems, those skilled in the art may modify the configuration of the shot unit 10 and, if necessary, those of other components associated therewith to suit to the characteristics of the corresponding sports.

Next, the illumination device 20 according to one embodiment of the invention may irradiate light artificially when a golfer plays virtual golf indoors or outdoors. As necessary, the illumination device 20 may be turned on and off, or the brightness thereof may be adjusted. Preferably, the illumination device 20 may be an infrared illumination device for preventing natural deterioration of the images of the golf ball caused by the flickering of the light.

Next, the photographing device 100 according to one embodiment of the invention may comprise at least one camera (e.g., a high-speed camera) (not shown) and function to acquire two or more images of the golf ball (e.g., images of the moving golf ball). As shown in FIG. 1, the photographing device 100 may be disposed in a location to look down at the moving golf ball, while it may be disposed in other locations.

Further, the photographing device 100 according to one embodiment of the invention may function to efficiently acquire (i.e., photograph) a plurality of golf ball images, which are necessary in accurately measuring a physical quantity of a ball, by recognizing a location of a ball whose physical quantity is to be measured, in a state in which shot preparation is completed, and dynamically determining a region of interest to be photographed to acquire images including an appearance of the ball, with reference to the location of the ball and at least one of a predicted moving direction of the ball and a location of at least one camera configured to photograph the ball.

According to one embodiment of the invention, an image of the golf ball may be considered to be better if a mark on the surface of the golf ball is clearly shown such that a shape or location of the mark may be better specified. For example, if the mark shown in a region corresponding to the ball in the image of the golf ball is clearer, the simulator 200 to be described below may more accurately identify a mark sequence, which is a time-sequential set of marks appearing over a plurality of golf ball images, and calculate a spin rate and a spin direction of the golf ball.

The detailed configuration of the photographing device 100 will be further described later with reference to FIG. 2.

Next, the simulator 200 according to one embodiment of the invention may function to acquire from the photographing device 100 a plurality of images in which a ball whose physical quantity is to be measured is photographed, and analyze a time-sequential set of marks appearing over the plurality of golf ball images (i.e., a mark sequence) to measure a spin rate and a spin direction of the golf ball. Further, the simulator 200 according to one embodiment of the invention may implement movement of the golf ball in virtual reality, on the basis of information on the spin rate and spin direction of the golf ball measured as above.

Meanwhile, the simulator 200 according to one embodiment of the invention may communicate with the photographing device 100 and the display device 300, and may comprise a dedicated processor for virtual golf simulation. The dedicated processor may be provided with memory means and may have numerical operation and graphics processing capabilities.

The configuration of the simulator 200 will be further described later with reference to FIG. 3.

Lastly, the display device 300 according to one embodiment of the invention may function to display a result of the physical quantity measurement or virtual reality implementation of the simulator 200. The display device 300 may display images via display means and, for example, may be configured with a screen, which absorbs the impact of the hit golf ball and does not emit light directly, and a projector to output images on the screen.

Configuration of Photographing Device

Hereinafter, the internal configuration of the photographing device 100 according to one embodiment of the invention and the functions of the respective components thereof will be described.

Figure 2:
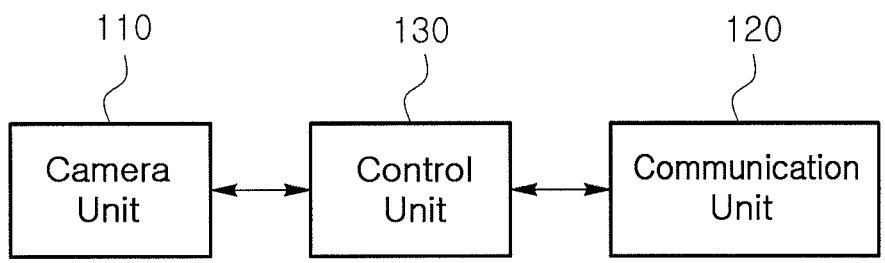
FIG. 2 is a detailed diagram of the internal configuration of a photographing device 100 according to one embodiment of the invention.

FIG. 2 is a detailed diagram of the internal configuration of the photographing device 100 according to one embodiment of the invention.

As shown in FIG. 2, the photographing device 100 may be configured to comprise a camera unit 110, a communication unit 120 and a control unit 130.

According to one embodiment of the invention, at least some of the camera unit 110, the communication unit 120 and the control unit 130 may be program modules to communicate with the simulator 200. The program modules may be included in the photographing device 100 in the form of operating systems, application program modules or other program modules, while they may be physically stored in a variety of commonly known storage devices. Further, the program modules may also be stored in a remote storage device that may communicate with the photographing device 100. Meanwhile, such program modules may include, but not limited to, routines, subroutines, programs, objects, components, data structures and the like for performing specific tasks or executing specific abstract data types as will be described below in accordance with the present invention.

Meanwhile, although the photographing device 100 has been described as above, the above description is illustrative and it will be apparent to those skilled in the art that all or a part of the functions or components required for the photographing device 100 may be implemented or included in the simulator 200 to be described below, as necessary.

First, the camera unit 110 according to one embodiment of the invention may comprise a camera that may optically acquire a plurality of images. For example, the camera unit 110 according to one embodiment of the invention may comprise a high-speed or ultrahigh-speed camera capable of photographing tens of frames of images per second.

Next, the communication unit 120 according to one embodiment of the invention may function to mediate data transmission/reception between the control unit 130 and the simulator 200, as necessary. According to one embodiment of the invention, although there is no particular limitation on the communication modality that may be employed by the communication unit 120, wired communication such as wired LAN communication and cable communication, or wireless communication such as wireless LAN communication, infrared communication, RF communication and Bluetooth communication may preferably be employed.

Next, the control unit 130 according to one embodiment of the invention may function to control data flow among the camera unit 110 and the communication unit 120. That is, the control unit 130 according to the invention may control inbound/outbound data flow of the photographing device 100 or data flow among the respective components of the photographing device 100, such that the camera unit 110 and the communication unit 120 may carry out their particular functions, respectively.

Particularly, according to one embodiment of the invention, the control unit 130 may recognize a location of a ball whose physical quantity is to be measured, in a state in which shot preparation is completed, and dynamically determine a region of interest to be photographed to acquire images including an appearance of the ball, with reference to the location of the ball and at least one of a predicted moving direction of the ball and a location of at least one camera configured to photograph the ball.

Here, according to one embodiment of the invention, the region of interest indicates a region to be photographed by the camera unit 110, and may be at least a partial region of the shot unit 10 on which the ball is placed. Since the performance of a camera for photographing the ball or a processor for processing the photographed images is limited, photographing quality of the photographed images (e.g., the number of frames per second (fps), the number of pixels, etc.) is generally lowered as the region to be photographed becomes larger. Thus, it is necessary to appropriately determine the region of interest to be photographed, on the basis of various situation information related to the location where the ball is placed, the predicted moving direction of the ball, the location of the camera, and the like.

Specifically, according to one embodiment of the invention, the control unit 130 may determine a center position of the region of interest, with reference to the predicted moving direction of the ball or the location of the camera and the location of the ball recognized in a state in which shot preparation is completed.

For example, the control unit 130 according to one embodiment of the invention may cause a distance between the locations of the camera and the ball to be smaller than a distance between the location of the camera and the center position of the region of interest. In other words, it is general that an image of the ball to be photographed is formed on the opposite side of the camera from the viewpoint of the camera, and the hit ball moves floating in the air. Thus, the location of the ball in the region of interest needs to be biased toward the camera, so that the camera may photograph images containing the whole appearance of the ball contrasting with the surface of the shot unit 10, as many as possible (or as long as possible).

As another example, the control unit 130 according to one embodiment of the invention may cause the location of the ball to be behind the center position of the region of interest, with respect to the predicted moving direction of the ball. In other words, the center position of the region of interest needs to be distant from the starting point of a predicted moving path of the ball (i.e., the location of the ball) along the predicted moving direction of the ball, so that the camera may photograph images containing the whole appearance of the ball contrasting with the surface of the shot unit 10, as many as possible (or as long as possible).

Further, according to one embodiment of the invention, the control unit 130 may determine a shape of the region of interest, with reference to the predicted moving direction of the ball or the location of the camera and the location of the ball recognized in a state in which shot preparation is completed.

For example, the control unit 130 according to one embodiment of the invention may determine the region of interest of a rectangular shape in which the side parallel to the predicted moving direction of the ball is longer than the side perpendicular to the predicted moving direction of the ball. In other words, the region of interest needs to be elongate along the predicted moving path of the ball, so that the camera may photograph images containing the whole appearance of the ball contrasting with the surface of the shot unit 10, as many as possible (or as long as possible).

Figure 4:
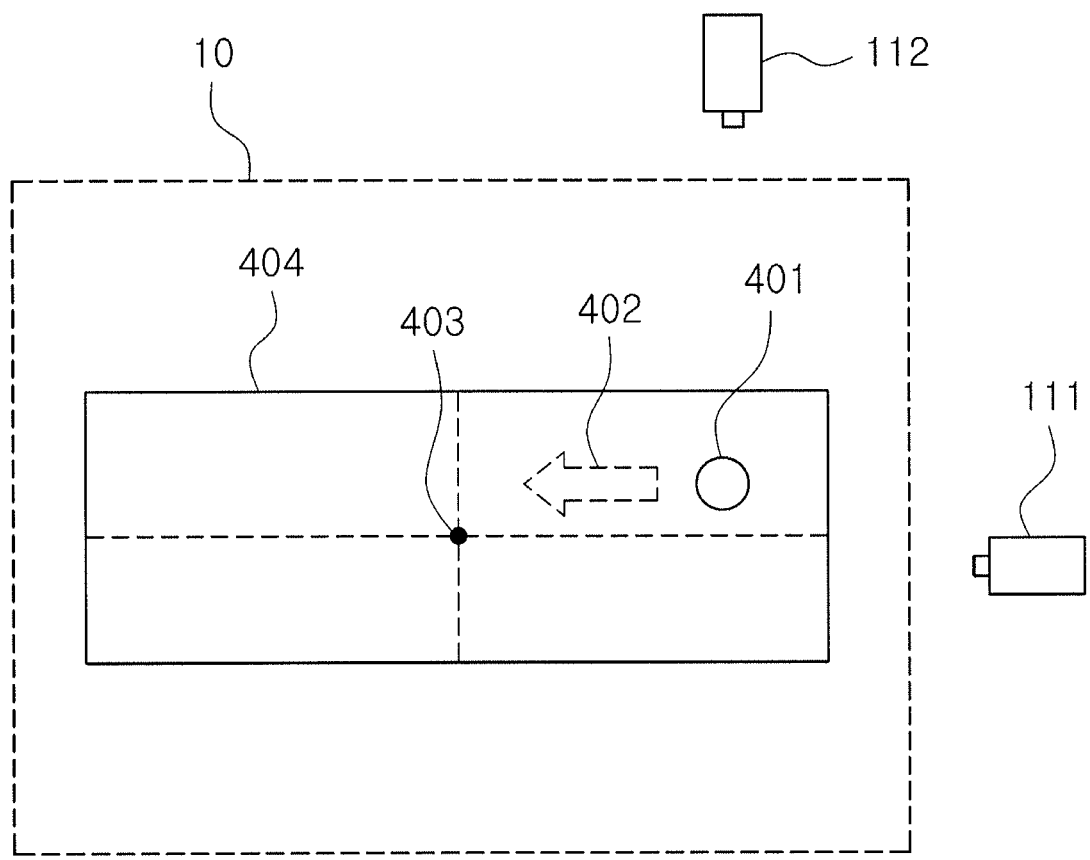
FIG. 4 illustratively shows how to determine a region of interest to be photographed according to one embodiment of the invention.

FIG. 4 illustratively shows how to determine a region of interest to be photographed according to one embodiment of the invention.

Referring to FIG. 4, the control unit 130 according to one embodiment of the invention may determine a region of interest 404 for which ball images are to be photographed, by causing a ball 401 to be located closer to cameras 111, 112 than a center position 403 of the region of interest 404 and to be behind the center position 403 of the region of interest with respect to a predicted moving direction 402 of the ball 401, so that the camera 111 located on the rear side of the shot unit 10 and the camera 112 located on the right side of the shot unit 10 may photograph images containing the whole appearance of the ball 401 contrasting with the surface of the shot unit 10, as many as possible.

Next, according to one embodiment of the invention, the control unit 130 may function to dynamically determine photographing quality of the images photographed by the camera unit 110, with reference to the size of the region of interest determined as above. Here, according to one embodiment of the invention, the dynamically determined photographing quality of the images may include the number of frames per second (fps), the number of constituent pixels, a compression (or encoding) format and the like of the images.

Specifically, the control unit 130 according to one embodiment of the invention may determine the photographing quality of the images in which the region of interest is photographed to be as high as permitted by the performance of the camera unit 110.

For example, the size (i.e., area) of the region of interest may be determined to be relatively large, on the basis of the fact that a moving speed of a ball is relatively fast when a user hits the ball using a driver. In this case, the photographing quality of the images may be determined to be relatively low.

As another example, the size (i.e., area) of the region of interest may be determined to be relatively small, on the basis of the fact that a moving speed of a ball is relatively slow when a user hits the ball using a putter. In this case, the photographing quality of the images may be determined to be relatively high.

Meanwhile, according to one embodiment of the invention, before determining the aforementioned region of interest, the control unit 130 may determine whether shot preparation is completed, with reference to the appearance or location of the ball appearing in the images photographed by the camera unit 110. For example, when a state in which the ball rests still on the surface of the shot unit 10 or on a tee is continued for a predetermined time period or more, it may be determined that shot preparation is completed.

Here, the control unit 130 according to one embodiment of the invention may increase the probability of accurately recognizing a ball present at an arbitrary location on the shot unit 10, by determining the size of the region of interest for which images are to be photographed to determine whether shot preparation is completed to be larger than that of the region of interest for which images are to be photographed to measure a physical quantity of the ball (e.g., by determining the entire surface of the shot unit 10 as the region of interest).

Further, the control unit 130 according to one embodiment of the invention may save resources and time spent in image processing or operation for determining whether shot preparation is completed, which does not require high-speed photographing or high-quality images, by determining the photographing quality of the images photographed to determine whether shot preparation is completed to be lower than that of the images photographed to measure a physical quantity of the ball.

Configuration of Simulator

Hereinafter, the internal configuration of the simulator 200 according to one embodiment of the invention and the functions of the respective components thereof will be described.

Figure 3:
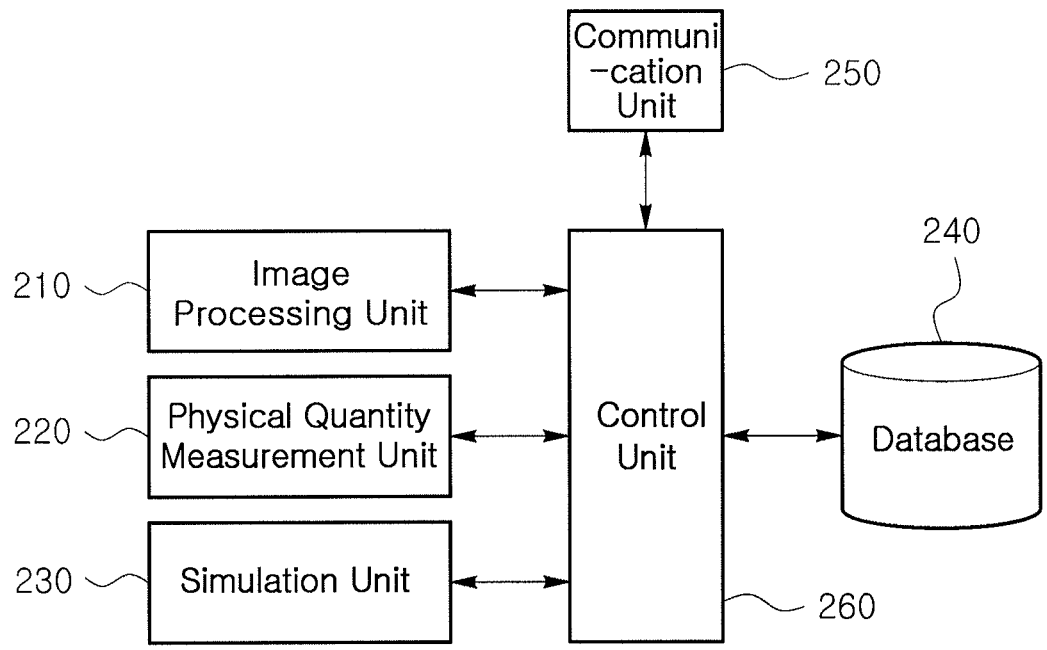
FIG. 3 is a detailed diagram of the internal configuration of a simulator 200 according to one embodiment of the invention.

FIG. 3 is a detailed diagram of the internal configuration of the simulator 200 according to one embodiment of the invention.

As shown in FIG. 3, the simulator 200 according to one embodiment of the invention may be configured to comprise an image processing unit 210, a physical quantity measurement unit 220, a simulation unit 230, a database 240, a communication unit 250, and a control unit 260. Further, according to one embodiment of the invention, the image processing unit 210 may comprise an image acquisition unit (not shown) and an image compensation unit (not shown). According to one embodiment of the invention, at least some of the image processing unit 210, the physical quantity measurement unit 220, the simulation unit 230, the database 240, the communication unit 250, and the control unit 260 may be program modules to communicate with the photographing device 100 or the display device 300. The program modules may be included in the simulator 200 in the form of operating systems, application program modules or other program modules, while they may be physically stored in a variety of commonly known storage devices. Further, the program modules may also be stored in a remote storage device that may communicate with the simulator 200. Meanwhile, such program modules may include, but not limited to, routines, subroutines, programs, objects, components, data structures and the like for performing specific tasks or executing specific abstract data types as will be described below in accordance with the present invention.

Meanwhile, although the simulator 200 has been described as above, the above description is illustrative and it will be apparent to those skilled in the art that all or a part of the functions or components required for the simulator 200 may be implemented or included in the photographing device 100, as necessary.

First, according to one embodiment of the invention, the image processing unit 210 (specifically, the image acquisition unit) may function to acquire from the photographing device 100 a plurality of images in which a ball whose physical quantity is to be measured is photographed.

Next, the physical quantity measurement unit 220 according to one embodiment of the invention may function to analyze a mark sequence appearing in the plurality of golf ball images (more specifically, the plurality of temporally adjacent golf ball images), thereby measuring a spin rate and a spin direction of the golf ball. Specifically, the physical quantity measurement unit 220 according to one embodiment of the invention may estimate the spin rate and spin direction of the golf ball, with reference to a moving speed and a moving direction of the mark on the surface of the golf ball observed from the above mark sequence. Further, the physical quantity measurement unit 220 according to one embodiment of the invention may also function to calculate a movement trajectory, a moving speed, or a height of the golf ball.

Next, the simulation unit 230 according to one embodiment of the invention may implement movement of the golf ball (e.g., a spin rate, a spin direction, a moving speed, a moving direction, an angle of departure, etc.) in virtual reality, on the basis of a variety of information on the physical quantities of the golf ball measured as above. Further, the simulation unit 230 according to one embodiment of the invention may transmit to the display device 300 a control signal reflecting the movement of the golf ball in a graphical object or containing a video signal, so that the movement of the golf ball may be realistically displayed in the display device 300.

Next, the database 240 according to one embodiment of the invention may store information on the photographed images of the golf ball, the mark sequence, the calculated physical quantities and the like, or information required for the simulation (e.g., data required to implement the virtual reality). Although FIG. 3 shows that the database 240 is incorporated in the simulator 200, the database 240 may be configured separately from the simulator 200 as needed by those skilled in the art to implement the invention. Meanwhile, the database 240 according to the invention encompasses a computer-readable recording medium, and may refer not only to a database in a narrow sense but also to a database in a broad sense including file system-based data records and the like. The database 240 according to the invention may be even a collection of simple logs if one can search and retrieve data from the collection.

Next, the communication unit 250 according to one embodiment of the invention may function to enable data transmission/reception to/from the simulator 200. Although there is no particular limitation on the communication modality that may be employed by the communication unit 250, wired communication such as wired LAN communication and cable communication, or wireless communication such as wireless LAN communication, infrared communication, RE communication, and Bluetooth communication may preferably be employed.

Lastly, the control unit 260 according to one embodiment of the invention may function to control data flow among the image processing unit 210, the physical quantity measurement unit 220, the simulation unit 230, the database 240, and the communication unit 250. That is, the control unit 260 according to the invention may control inbound/outbound data flow of the simulator 200 or data flow among the respective components of the simulator 200, such that the image processing unit 210, the physical quantity measurement unit 220, the simulation unit 230, the database 240, and the communication unit 250 may carry out their particular functions, respectively.

Although it has been mainly described above that the virtual sport system of the present invention is a virtual golf system, it will be apparent to those skilled in the art that the technical principle and configuration of the invention may be applied to all kinds of virtual sport systems (e.g., virtual baseball systems or virtual football systems) requiring simulation of the movement of a ball.

The embodiments according to the present invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for determining a region of interest for photographing ball images, comprising the steps of:
    recognizing a location of a ball on a shot unit in a state in which shot preparation is completed;
    determining a region of interest in a top surface area of the shot unit, with reference to the location of the ball on the shot unit and a location of at least one camera configured to photograph the ball; and
    photographing, by the at least one camera, the region of interest to acquire images including an appearance of the ball,
    wherein at least one of a position, shape and size of the region of interest is determined such that the ball is located proximate to a point of a boundary of the region of interest, the point being closest to the location of the at least one camera among the boundary of the region of interest, and
    wherein the size of the region of interest is determined based on a type of a golf club.

2. The method of claim 1, wherein in the determining step, a center position of the region of interest is dynamically determined, with reference to the location of the ball and at least one of the predicted moving direction of the ball and the location of the at least one camera.

3. The method of claim 2, wherein in the determining step, the center position of the region of interest is dynamically determined, such that a distance between the location of the at least one camera and the location of the ball is smaller than a distance between the location of the at least one camera and the center position of the region of interest.

4. The method of claim 2, wherein in the determining step, the center position of the region of interest is dynamically determined, such that the location of the ball is behind the center position of the region of interest, with respect to the predicted moving direction of the ball.

5. The method of claim 1, further comprising the step of:
    dynamically determining photographing quality of the images, with reference to the size of the region of interest.

6. A non-transitory computer-readable recording medium having stored thereon a computer program for executing the method of claim 1.

7. A system for determining a region of interest for photographing ball images, comprising:
    at least one camera configured to photograph a ball; and
    non-transitory computer readable media having program instructions, when executed by a processor, that cause the system to:
    recognize a location of the ball on a shot unit in a state in which shot preparation is completed,
    determine a region of interest in a top surface area of the shot unit, with reference to the location of the ball on the shot unit and a location of the at least one camera,
    photograph, by the at least one camera, the region of interest to acquire images including an appearance of the ball,
    wherein at least one of a position, shape and size of the region of interest is determined such that the ball is located proximate to a point of a boundary of the region of interest, the point being closest to the location of the at least one camera among the boundary of the region of interest, and
    wherein the size of the region of interest is determined based on a type of a golf club.

8. The system of claim 7, wherein the program instructions, when executed by a processor, cause the system to dynamically determine a center position of the region of interest, with reference to the location of the ball and at least one of the predicted moving direction of the ball and the location of the at least one camera.

9. The system of claim 8, wherein the program instructions, when executed by a processor, cause the system to dynamically determine the center position of the region of interest, such that a distance between the location of the at least one camera and the location of the ball is smaller than a distance between the location of the at least one camera and the center position of the region of interest.

10. The system of claim 8, wherein the program instructions, when executed by a processor, cause the system to dynamically determine the center position of the region of interest, such that the location of the ball is behind the center position of the region of interest, with respect to the predicted moving direction of the ball.

11. The system of claim 7, wherein the program instructions, when executed by a processor, cause the system to dynamically determine photographing quality of the images, with reference to the size of the region of interest.

* * * * *